No. 800,488. PATENTED SEPT. 26, 1905.
L. M. RICHARDSON.
SKATE ROLLER.
APPLICATION FILED SEPT. 14, 1904.

Witnesses:
Chas. E. Gaylord.
John Enders.

Inventor:
Levant M. Richardson,
By Dyrenforth, Dyrenforth & Lee,
Att'ys

UNITED STATES PATENT OFFICE.

LEVANT M. RICHARDSON, OF CHICAGO, ILLINOIS.

SKATE-ROLLER.

No. 800,488.  Specification of Letters Patent.  Patented Sept. 26, 1905.

Application filed September 14, 1904. Serial No. 224,362.

*To all whom it may concern:*

Be it known that I, LEVANT M. RICHARDSON, a citizen of the United States, residing at Chicago, in the county of Cook and State of Illinois, have invented a new and useful Improvement in Skate-Rollers, of which the following is a specification.

My object is to provide a ball-bearing roller for roller-skates of a particularly simple, light, strong, and durable construction.

In the accompanying drawings I illustrate my improved roller in various forms, all, however, embodying the gist of my invention, which, broadly stated, consists in providing the roller with a center formed of two sheet-metal side disks only and with a seamless tread or rim portion.

Figure 1:
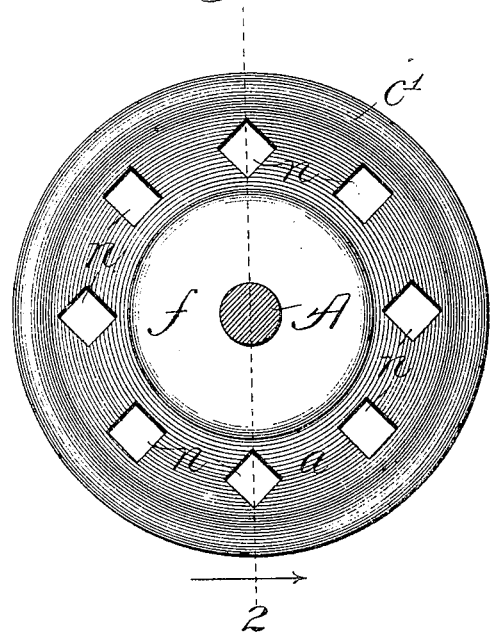
Figure 2:
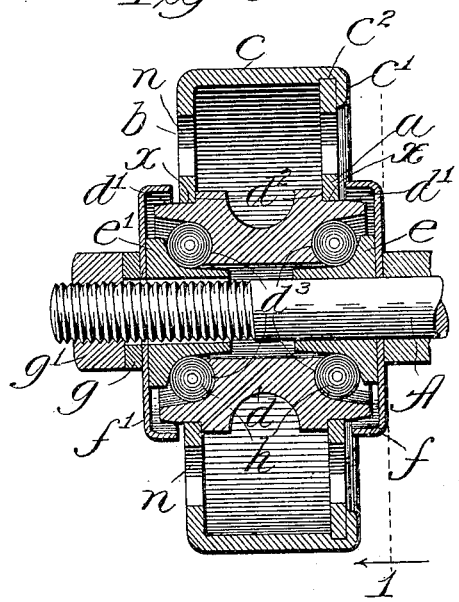
Figure 3:
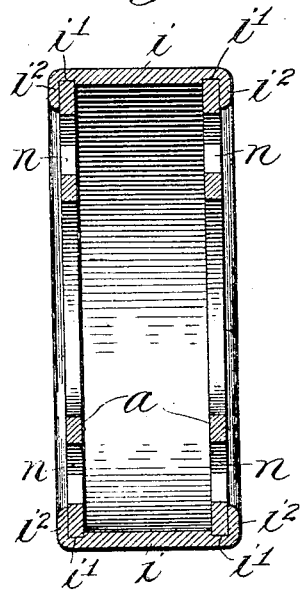

Referring to the drawings, Figure 1 is an elevation of the inner side of the roller, the shaft being in section taken on line 1 in Fig. 2; Fig. 2, a broken section on line 2 in Fig. 1, showing one construction; Fig. 3, a section through a roller center and tread, showing another construction; and Fig. 4, a broken section of the same character as Fig. 2, but showing a construction in which the inner ball-race members are integral with the disks which form the roller center.

In the construction illustrated in Fig. 2 the roller center is formed of an annular disk $a$ of sheet metal at one side and with an annular disk $b$ on the opposite side, also cut or stamped out of sheet metal and having an integral flange $c$ forming the tread of the roller. The piece $b\,c$ is cup-shaped, the part $c$ presenting a cylindrical tread, which at its free annular edge has a flange $c'$ extending over the outer annular edge of the disk $a$. At the flange $c'$ the inner face of the tread $c$ is formed with an annular socket $c^2$, which receives the peripheral portion of the disk $a$. In this construction a hub $d$ is provided, formed with cylindrical end surfaces $d'$, around which the disks $a\,b$ fit at their central openings $x$ to bear against annular shoulders $d^2$ on the hub. The three parts described are pressed together, as shown, and are practically integral. The ends of the hub are ball-race members $d^3$. A is the roller-skate shaft carrying the ball-race members $e\,e'$, dust-guards $f\,f'$, washer $g$, and nut $g'$, which are placed in position, as shown, and tightened by the nut to hold the balls $h$ between the race members.

In the construction shown in Fig. 3 the wheel center is formed of two side disks $a$, while the tread $i$ is a short cylinder cut from a sheet-metal tube and formed with the sockets $i'$ to receive the disks $a$, which are held by flanges $i^2$ integral with the tread.

Figure 4:
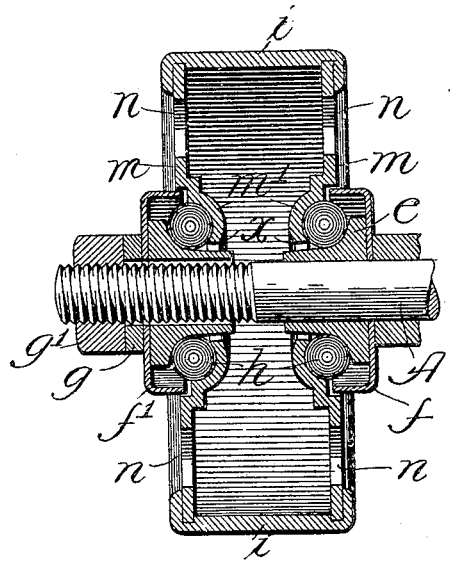

In the construction shown in Fig. 4 the roller center is formed of two annular side disks $m\,m$, shaped around their central openings $x$ to form inner ball-race members $m'$ in lieu of the hub $d$. (Illustrated in Fig. 2.) The shaft A and attendant parts constituting the ball-bearing may be the same as those described in connection with Fig. 2. In this construction I have shown the tread $i$ formed as in Fig. 3.

In each of the constructions the side disks are provided with openings $n$ for ornamentation and to decrease weight. The roller centers and treads are formed in each instance from sheet metal cut or stamped and pressed into shape, so that the cost of manufacture is comparatively small. Rollers formed as described are particularly light, strong, and durable and are especially desirable for roller-skates.

While I prefer to construct my improvements as shown and described, they may of course be variously modified in the matter of details without departing from the spirit of my invention as defined by the claim.

What I claim as new, and desire to secure by Letters Patent, is—

A hollow skate-roller comprising two annular centrally-apertured disks, a tread-flange integral with one of the disks and having a socket confining the other disk at its periphery, a hub having ends fitting the disk-apertures and having shoulders against which the disks abut, ball-races in the hub, and a shaft carrying companion ball-races.

LEVANT M. RICHARDSON.

In presence of—
 WALTER N. WINBERG,
 W. B. DAVIES.